(No Model.) 2 Sheets—Sheet 1.

F. VON HEFNER-ALTENECK.
DYNAMO ELECTRIC MACHINE.

No. 249,495. Patented Nov. 15, 1881.

WITNESSES
F. M. Burnham
George Bethard

INVENTOR
F von Hefner Alteneck
by
Charles S. Whitman ATTORNEYS.

(No Model.) 2 Sheets—Sheet 2.

F. VON HEFNER-ALTENECK.
DYNAMO ELECTRIC MACHINE.

No. 249,495. Patented Nov. 15, 1881.

WITNESSES
INVENTOR
ATTORNEYS

UNITED STATES PATENT OFFICE.

FRIEDRICH VON HEFNER-ALTENECK, OF BERLIN, GERMANY, ASSIGNOR TO CHARLES WILLIAM SIEMENS, OF WESTMINSTER, ENGLAND.

DYNAMO-ELECTRIC MACHINE.

SPECIFICATION forming part of Letters Patent No. 249,495, dated November 15, 1881.

Application filed August 3, 1881. (No model.)

*To all whom it may concern:*

Be it known that I, FRIEDRICH VON HEFNER-ALTENECK, a citizen of Prussia, residing at Berlin, in the Empire of Germany, have invented an Improved Dynamo-Magneto-Electric Machine, of which the following is a specification, the same being the division of an application for Letters Patent filed January 22, 1879.

My invention relates to a dynamo-magneto-electric machine—that is to say, a machine producing electricity by mechanical power applied to give rotation to magnetic bodies, or for producing mechanical power by electricity applied to cause the rotation of these bodies.

The construction of my improved machine will be understood by reference to the accompanying drawings, of which—

Figure 1:
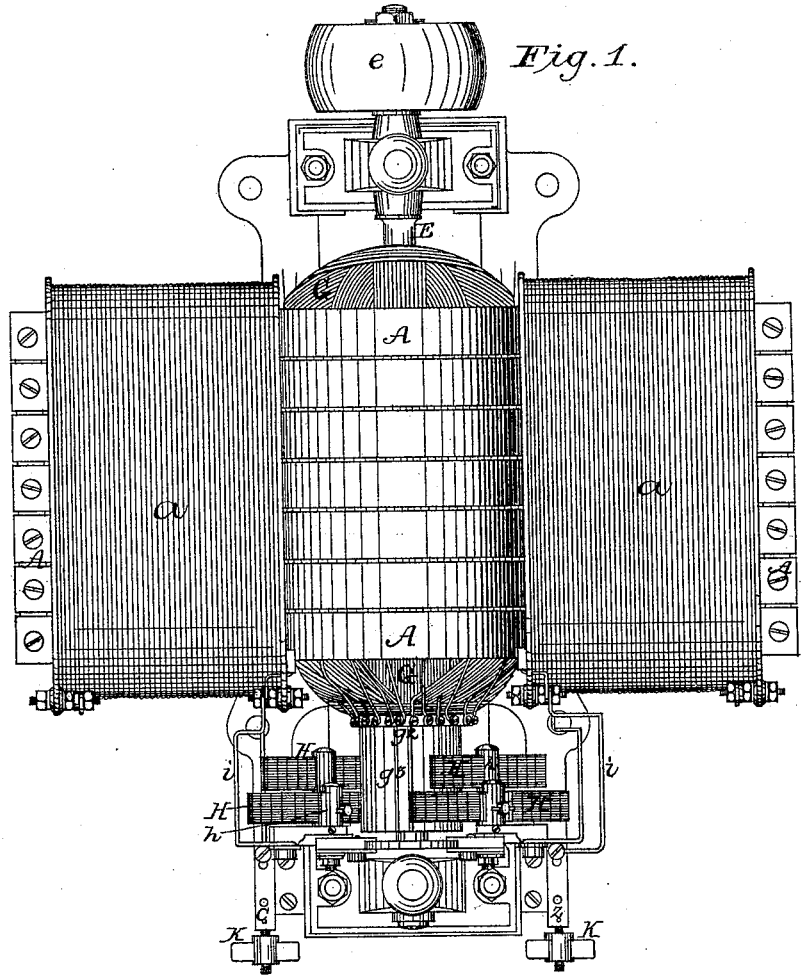
Figure 2:
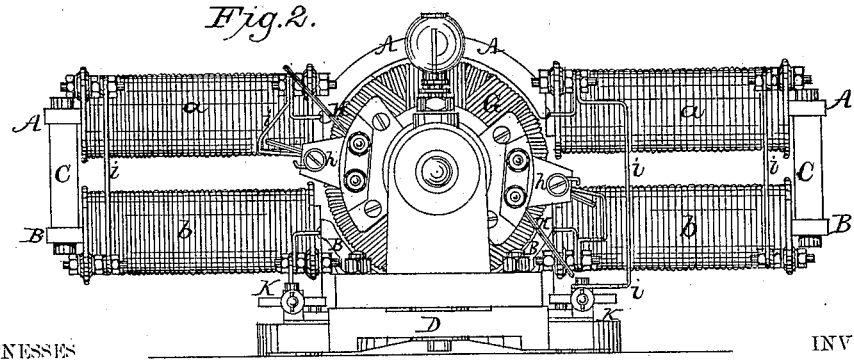
Figure 5:
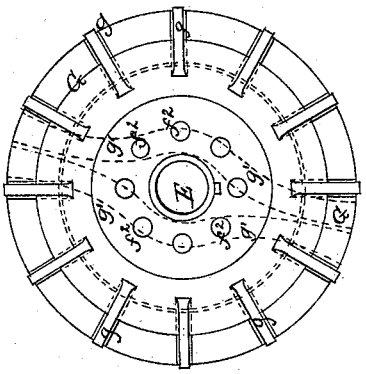
Figure 7:
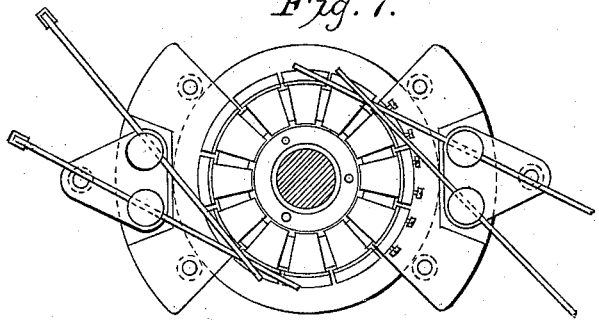
Figure 3:
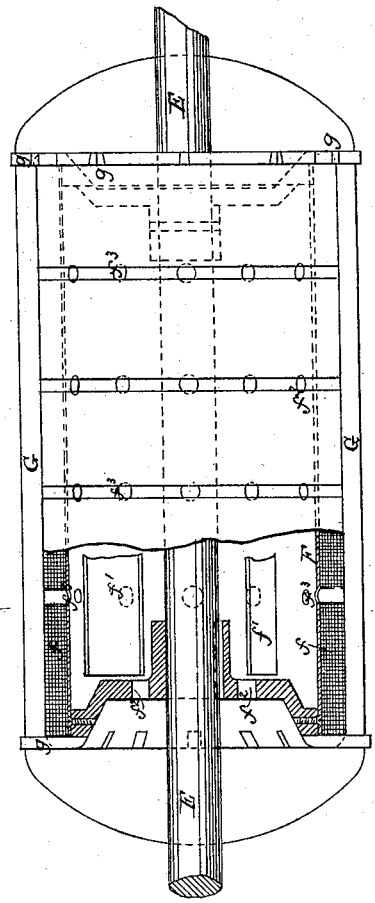
Figure 6:
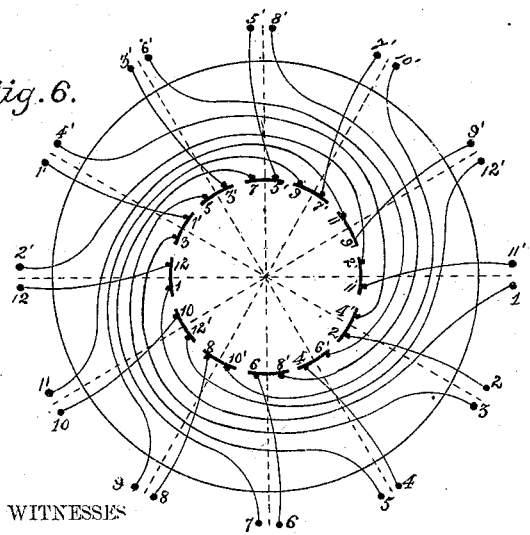
Figure 4:
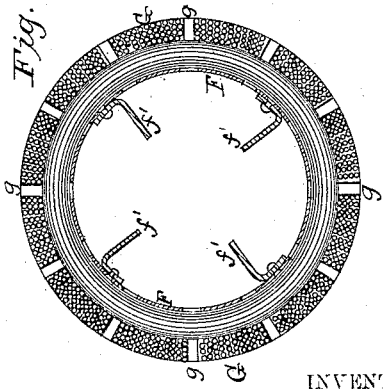

Figure 1 represents a plan, and Fig. 2 an end view, of the complete machine. Fig. 3 is a plan, partly in section, of the internal rotating cylinder. Fig. 4 is a transverse section, and Fig. 5 a view of the back end of the same. Fig. 6 is a diagrammatic view of the front end thereof, showing the method of connecting the conducting-wires to the rotating commutator, a section of which, with the conducting-brushes applied thereto, is shown by Fig. 7.

A number of bars of soft iron, A, bent upward to a circular curvature in the middle, and a corresponding number of similar bars, B, bent downward in the middle, are secured to each other by iron struts C, Fig. 2, and to a base, D. Insulated conducting-wires $a$ are coiled round the upper bars, A, and similar wires, $b$, are coiled round the lower bars, these coils being connected, and the coiling being so arranged that when a current of electricity is transmitted through the coils the bars become magnetic, the middle curved parts of A and B becoming oppositely polar—that is to say, the one being a north and the other a south pole.

Between the curved portions of the bars A and B is a rotating cylinder or armature, fixed on a shaft, E, which is mounted in bearings and caused to revolve rapidly by a strap driving the pulley $e$, or otherwise. The cylinder consists of a thin shell, F, of non-magnetic metal—such as brass—on which are wound soft-iron wires $f$, forming an annular cylinder, or a number of successive rings along the cylindrical shell. The cylinder might, however, be simply made of soft iron in annular form; but the wire construction above mentioned is preferred, because, when the iron is in the form of wire, the magnetic induction thereupon is more rapid and complete.

For the purpose of cooling the machine while it is at work, I provide vanes $f'$, Fig. 4, inside the cylindrical shell, and holes $f^2 f^3$ through its ends and periphery, respectively, so that when the cylinder is rapidly rotating currents of air are made to enter by the holes $f^2$ and issue by the holes $f^3$.

On the outer periphery of the cylinder insulated conducting-wires G are wound lengthwise of the cylinder in a number of groups (of which twelve are shown in the figures) kept separate by radial projections $g$ at each end of the cylinder. In each group there are preferably two or other even number of wires coiled, the convolutions of which at the ends of the cylinder bend round to clear the shaft E, as indicated by the lines $g'$ in Fig. 5, which show the course taken by the convolutions belonging to two opposite groups. The terminals of these wires are at the front end of the cylinder secured by screws $g^2$, respectively, to a number of insulated plates, $g^3$, of a rotating commutator, which consists of these plates arranged cylindrically round the shaft E, the connections of the several wires to these plates being preferably arranged in the manner indicated by the diagram, Fig. 6, in which the one terminal of each coil is marked by a numeral, and the other terminal of the same coil is marked by the same numeral with a dash—as, for example, 8 and 8'.

Two pairs of wire brushes, H, bear upon the surface of the plates $g^3$, and these brushes are fixed on insulated supports $h$, which are connected by conducting-wires $i$, respectively, through the coils $a$ and $b$ to the two insulated terminals K K. As the cylinder is caused to rotate, each successive portion of its iron periphery as it passes through the polar fields of A and B has magnetism induced upon it, and this creates a succession of electric currents along the wires of the successive coils G. These currents, being transmitted to the plates $g^3$, are successively carried by the metallic brushes H H and the conductors $i$ through the coils $a$ and $b$, materially increasing the magnetism of the bars A and B, and from the coils to the positive and negative terminals K K, whence they can be conducted away, to be used for any purpose to which electricity is applicable. By connecting the terminals K K with the poles of a battery or other source of electricity, or with the terminals of another machine of like kind, so as to cause a current of electricity to pass through the coils of the machine, the cylinder and shaft E are caused to rotate, giving out mechanical power.

The mode of winding the wires G on the cylinder may be varied, as persons practiced in the art will readily understand. For example, instead of winding them in twelve groups, as shown in the drawings, they may be wound in any other even number of groups, the number being necessarily even, because the wire which extends from front to back along one division of the circumference has to return from back to front along the opposite division.

One method of winding a single line of wire which I find advantageous in practice is as follows: I wind the wire to and fro along one of the divisions, and its opposite to half the depth to which the wire is intended to be wound, and then attach a loop of the wire to a plate of the commutator. I continue to wind the wire in the same manner along the next division and its opposite; again I secure a loop to the next plate of the commutator, and so I proceed till all the divisions have received half their quantity of wire. I then repeat a similar succession of windings along the successive divisions, so filling them up with their whole quantity of wire, and at the end of the winding I join the end of the wire to its beginning and connect both to the last of the commutator-plates. Instead of securing a loop to the commutator-plate, as above described, almost midway in the winding, several such loops may be so secured in the course of the winding over each pair of divisions, and in that case the commutator will have an increased number of plates, one for each such loop. This subdividing of the commutation is of advantage, as there are fewer sparks produced for a given number of wire convolutions. When the machine is to be applied to circuits presenting a small resistance—as, for example, for electrolytical purposes—the wire may be of large size with few convolutions—such, for instance, as will give only one layer on the surface of the cylinder. Such wire may be wound, as above described, in two half portions, the second portion occupying space at the side of the first portion without overlying it.

Having thus described the nature of my invention and the best means I know of carrying it into practical effect, I claim—

1. An armature of a dynamo-electric machine consisting of the rotating cylinder on the shaft E, covered with iron wire, over which insulated conducting-wires are coiled lengthwise in separate groups, substantially as described.

2. The rotating cylinder or thin shell F, in combination with the successive rings of iron wire $f$, as described.

3. The combination, with the cylinder, of the projections $g$ at each end of the cylinder, whereby the conducting-wires, wound lengthwise of the cylinder in a number of groups, are kept separate.

4. The armature consisting of the rotating cylinder F, constructed as a thin shell covered with iron wire, over which insulated conducting-wires are coiled, in combination with vanes $f'$ inside the cylindrical shell, having holes $f^2$ $f^3$ through its ends and periphery, as and for the purposes described.

5. The curved bars A and B, with coils $a$ and $b$, in combination with the rotating cylinder E, covered with iron wire, over which insulated conducting-wires are coiled lengthwise, as and for the purposes described.

6. The hollow rotating cylinder F, revolved by the shaft E, over which insulated conducting-wires are wound lengthwise, the separated bars of soft iron A, the struts C, and the separated bars of soft iron B, all combined and operating together as and for the purposes described.

In testimony whereof I have signed my name to this specification, in the presence of two subscribing witnesses, this 25th day of June, A. D. 1881.

F. VON HEFNER-ALTENECK.

Witnesses:
BERTHOLD ROI,
CARL NEUER.